(12) United States Patent
Kepplinger et al.

(10) Patent No.: US 6,416,566 B1
(45) Date of Patent: *Jul. 9, 2002

(54) PROCESS FOR THE PRODUCTION OF LIQUID PIG IRON OR LIQUID STEEL PRE-PRODUCTS

(75) Inventors: Werner Leopold Kepplinger, Leonding; Felix Wallner; Johannes Schenk, both of Linz, all of (AT); Il-Ock Lee, Pohang (KR); Yong-Ha Kim, Pohang (KR); Moon Duk Park, Pohang (KR)

(73) Assignees: Voest-Alpine Industrieanlagenbau GmbH, Linz (AT); Pohang Iron & Steel Co., Ltd.; Research Institute of Industrial Science & Technology, Incorporated Foundation, both of Pohang (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/221,494

(22) Filed: Dec. 28, 1998

Related U.S. Application Data

(63) Continuation-in-part of application No. PCT/AT97/00143, filed on Jun. 26, 1997.

(30) Foreign Application Priority Data

Jun. 28, 1996 (AT) .............................................. 1154/96
Jun. 26, 1997 (WO) ................................ PCT/AT97/00143

(51) Int. Cl.[7] .............................................. C21B 13/14
(52) U.S. Cl. ........................ 75/446; 266/160; 266/172
(58) Field of Search ........................ 75/446; 266/160, 266/172

(56) References Cited

U.S. PATENT DOCUMENTS

| | | | |
|---|---|---|---|
| 3,264,096 A | * | 8/1966 | Agarwal et al. ............... 75/446 |
| 5,919,281 A | * | 7/1999 | Park et al. .................... 75/450 |
| 5,948,139 A | * | 9/1999 | Kepplinger et al. .......... 75/445 |

FOREIGN PATENT DOCUMENTS

| | | | |
|---|---|---|---|
| DE | 4240194 | * | 7/1994 |
| EP | 0316819 | * | 5/1989 |
| EP | 0594557 | * | 4/1994 |
| JP | 63-011611 | * | 1/1988 |
| JP | 01184211 | * | 7/1989 |
| JP | 08060215 | * | 3/1996 |
| KR | 9414825 | * | 7/1994 |

OTHER PUBLICATIONS

US 6,254,663, 7/2001, Kepplinger et al. (withdrawn)*

* cited by examiner

Primary Examiner—Melvyn Andrews
(74) Attorney, Agent, or Firm—Ostrolenk, Faber, Gerb & Soffen, LLP

(57) ABSTRACT

In the process for the production of liquid pig iron 943) or liquid steel pre-products from charging substances comprising iron ore (5) and fluxes and at least partially containing a portion of fines, the iron ore is directly reduced to sponge iron in at least two reduction stages (1, 2) by the fluidized bed method, the sponge iron is melted in a melt-down gasifying zone (39) under the supply of carbon carriers and an oxygen-containing gas, and a CO- and $H_2$-containing reducing gas is produced which is injected into reduction zones of the reduction stages (1, 2), is reacted there, is withdrawn as a top gas and optionally is supplied to a consumer. To achieve uniform reduction of the iron ore at optimum exploitation of the reducing gas, the iron ore (5) in a first reduction stage (1) by aid of the reducing gas is fractionated into at least two fractions having different grain size distributions each, each fraction is reduced by the reducing gas in a separate fluidized bed (6, 15), wherein the reducing gas maintains a first fluidized bed (6) containing the coarse-grain fraction and separates the fine-grain fraction from the same, and wherein, further, reducing gas is additionally introduced into the further fluidized bed (15) directly reduced iron ore (5) is discharged both from the first and from the further fluidized bed (6, 15) and the fine- and the coarse-grain fraction reduced in the first reduction stage (1) are further reduced in at least one further reduction stage (2) operating in the same manner as the first reduction stage (1) and from the last reduction stage (2) the fine-grain fraction is introduced into the melt-down gasifying zone (39) while being agglomerated by provision of oxygen, and the coarse-grain fraction is fed directly into the melt-down gasifying zone (39) gravitationally (FIG. 1).

6 Claims, 4 Drawing Sheets

PROCESS FOR THE PRODUCTION OF LIQUID PIG IRON OR LIQUID STEEL PRE-PRODUCTS

CROSS-REFERENCE TO RELATED APPLICATIONS

This is a continuation-in-part of International Application PCT/AT97/00143, with an International filing date of Jun. 26, 1997.

The invention relates to a process for the production of liquid pig iron or liquid steel pre-products from charging substances comprising iron ore and fluxes and at least partially containing a portion of fines, wherein the iron ore is directly reduced to sponge iron in at least two reduction stages by the fluidized bed method, the sponge iron is melted in a melt-down gasifying zone under the supply of carbon carriers and an oxygen-containing gas, and a CO- and $H_2$-containing reducing gas is produced which is injected into reduction zones of the reduction stages, is reacted there, is withdrawn as a top gas and optionally is supplied to a consumer, and a plant for carrying out the process.

A process for the reduction of ore with subsequent melting is known for example from EP-A-0 594 557. With this known process, in accordance with a preferred embodiment, reduction is carried out in two locally separated reduction zones connected in series, wherein the reducing gas exiting the first reduction zone is supplied to the second reduction zone, which is connected to precede the first reduction zone in the direction of flow of the fine ore, hence in counter-flow, and from there under compression is supplied to a preheating zone. Each of the two reduction zones has an upper section in which fine solid particles are reduced in a fluidized bed and a lower section to which coarser solid particles descend and in which they are reduced in a flown-through fixed bed.

Hereby, advantages result as compared to single-stage direct reduction, i.e. to direct reduction utilizing only a single reduction zone, said advantages consisting above all in a low consumption of reducing gas, namely for the following reason: technical reduction processes require a reduction temperature of at least 750° C., so that there inevitably results a minimum temperature of the reducing gas—when exiting the reduction zone—of 750°.

Since for technical reasons it is not admissible for the reducing gas from the melter gasifier to have temperatures in excess of 950° C., only a temperature gradient of roughly 200° C. is available, meaning that only roughly ⅓ of the sensible heat of the reducing gas can be utilized. To be able to maintain the above-indicated temperature level, it would be necessary with a single-stage reduction process to utilize reducing gas in an amount several times the amount required for reduction. This would result in insufficient exploitation of the reducing gas and hence in a high level of coal consumption in the melter gasifier.

Although this known process has proved its value, different degrees of reduction may result with the fine-grain fraction and the coarse-grain fraction of the iron ore when processing ores of different grain sizes, that is, when processing ores having a slightly higher portion of fine ore (e.g. run-of-mine ore). Remediation is difficult, as it is not possible with this known process to adjust the retention time of the fine-grain fraction independently of the retention time of the coarse-grain fraction of the iron ore in the reactor vessels.

With the known process, the completely reduced fine ore portion from the reduction zone arranged to immediately precede the melt-down gasifying zone is charged to the melt-down gasifying zone separately from the coarse ore portion, namely at the height of the fluidized bed forming above the fixed bed of the melt-down gasifying zone. Hereby, conveying-out of the fine-grain fraction along with the reducing gas generated in the melt-down gasifying zone is avoided. If the fluidized bed becomes overloaded with the charged fine-grain fraction, breakdown of the fluidized bed and subsequently damming-up of gas may ensue. This results in eruptive outbreaks of gas. Hereby, the gasification process for the carbon carriers and the melt-down process for the reduced iron ore, that is the sponge iron, is markedly disturbed. Uncontrollable fluctuations in the pressure and quantity of the generated reducing gas and formation of a reducing gas having a reductant composition which is disadvantageous to the reduction process may ensue.

From KR patent application 94-38980, a process of the initially described kind is known in which in the reduction zone arranged to imnnediately precede the melt-down gasifying zone the prereduced fine ore portion is discharged by means of the reducing gas and supplied to a separate fine ore reduction zone. From the latter, the completely reduced fine ore is also conducted to the fluidized bed zone in the melter gasifier, as according to EP-A - 0 594 557, so that, here, the disturbances already described above may occur in the melter gasifier.

In accordance with KR patent application 94-38980, the ore is prereduced in a first reduction zone, with the fine ore portion and the coarse ore portion being reduced together in a single reduction zone. This results in the disadvantages described in connection with EP-A - 0 594 557, namely in nonuniform degrees of reduction of the fine ore portion and of the coarse ore portion in this reduction zone.

The invention aims at avoiding these disadvantages and difficulties and has as its object to provide a process of the initially described kind as well as a plant for carrying out the process, by which not only a uniform reduction of the fine portion and coarse portion of the ore is feasible, namely in a reduction process which, in order to achieve good gas exploitation of the reducing gas, is a multiple-stage, i.e. at least two-stage, reduction process. In particular, disturbances of the melt-down process and of the production process for the reducing gas in the melt-down gasifying zone are also to be avoided herein.

With a process of the initially described kind, this object is achieved in accordance with the invention in that:

each of the two reduction stages is provided with two separate fluidized beds, wherein in a first reduction stage the iron ore by aid of the reducing gas is fractionated into at least two fractions having different grain size distributions each, namely into at least one coarse-grain fraction and at least one fine-grain fraction, each fraction is reduced by the reducing gas in a separate fluidized bed, wherein the reducing gas maintains a first fluidized bed containing the coarse-grain fraction and separates the fine-grain faction from the same, and wherein, further, reducing gas is additionally introduced into the further fluidized bed directly, in an amount and/or chemical composition such that reduction of the fine-grain fraction in this fluidized bed to a predetermined degree of metallization within a predetermined period of time is ensured, and reduced iron ore is discharged both from the first and from the further fluidized bed and the fine- and the coarse-grain fraction reduced in the first reduction stage are further reduced in a further reduction stage operating in the same manner as the first reduction stage and from the last reduction stage the fine-grain fraction is introduced into the melt-down gasifying zone while being agglomerated by provision of oxygen, preferably by means of a burner, and the coarse-grain fraction is fed directly into the melt-down gasifying zone gravitationally.

The charging of a reduced fine-grain fraction to a melt-down vessel by means of a burner is known per se from KR patent application 92-27502. But here, reduction by the reducing gas is effected in a single stage and melting down of the ore that is only prereduced in the single-stage process takes place by the so-called "in-bath" method. In accordance with this method, only a metal melt covered by a molten slag, without a fixed bed and without a fluidized bed, is present in a reactor vessel. The charged coal gasifies in the slag layer in which the charged prereduced ore is also completely reduced. However, the reduction process takes a completely different course than with the process of the initially described kind and the process in accordance with the invention, as, in prereduction, reduction of $Fe_2O_3$ by means of CO and/or $H_2$ is, at the most, only carried to the FeO stage and the prereduced ore is then completely reduced in the melt-down vessel by means of carbon, namely in accordance with the equation $FeO+C=Fe+CO$. These "in-bath" melting processes are therefore fundamentally different from the process of the initially described kind, because reduction by a reducing gas is effected only to a slight extent, namely to a degree of reduction of roughly 30%. For complete reduction in the melt-down reactor, a high percentage of carbon is required if compared to the process according to the invention, whereas with the process of the initially described kind and in accordance with the invention reduction to a degree of reduction of 90% or more is carried out exclusively by reducing gas. Since with the "in-bath" method there is no fixed bed and no fluidized bed, the problem underlying the invention, i.e. overloading of the fluidized bed, does not occur.

In accordance with a preferred embodiment, in both reduction stages the grain size distribution of the separated fine-grain fraction according to the invention is adjusted as a function of the overall grain size distribution by adjusting the amount of reducing gas supplied to the first fluidized bed per time unit and, at the same time, the degree of reduction of the fine-grain fraction is adjusted by adjusting the amount of secondary reducing gas which is directly supplied to this fraction additionally.

A simplified embodiment of the process according to the invention provides that the fine- and the coarse-grain fraction reduced in the first reduction stage are further reduced in the first fluidized bed of the further reduction stage together and the fine-grain fraction is once again separated and supplied to the further fluidized bed and there is further reduced.

Suitably, the fine-grain fraction reduced in the first reduction stage is supplied to the further fluidized bed of the further reduction stage directly and is further reduced there.

Another simplified process variant of the process set forth in the invention is characterized in that instead of via a burner the fine-grain fraction is introduced into the melt-down gasifying zone in close proximity to an oxygen feeding means opening into the melt-down gasifying zone.

A plant for carrying out the process according to the invention comprising at least two reduction units arranged in series, from which there run into a first reactor vessel a conveying duct for charging substances containing iron ore and fluxes, a gas feed duct for a reducing gas and a conveying duct destined for the reduction product formed in said reactor vessel and leading to a further reduction unit with a reactor vessel, and a gas discharge duct for the top gas, wherein the gas feed duct for the reducing gas forms a gas discharge duct for reducing gas from the further reduction unit and a further conveying duct for the reduction product formed in the further reduction unit runs into a melter gasifier provided with supply ducts for oxygen-containing gases and carbon carriers as well as with a tap for pig iron or steel prematerial and slag, wherein the reducing-gas feed duct for reducing gas formed in the melter gasifier which runs into the further reduction unit departs from the melter gasifier, is characterized in that each of the reduction units is provided with at least two reactor vessels arranged in series in the direction of flow of the iron ore, each reactor vessel having a separate fluidized bed therein, and with one gas feed duct for the reducing gas leading to each of said reactor vessels in parallel arrangement, wherein from the reactor vessel that is first if viewed in the direction of flow of the iron ore a reducing-gas discharging means runs into the second reactor vessel of the same reduction unit intended for the fine-grain fraction of the iron ore to be reduced and a conveying duct for the reduction product departs from each reactor vessel, and wherein further the two conveying ducts leading out of the first reduction unit run into the further reduction unit and the conveying ducts departing from the further reduction unit—in case this forms the last reduction unit—lead to the melter gasifier separately, namely a conveying duct departing from the first reactor vessel of the last reduction unit enters the melter gasifier directly and a conveying duct departing from the second reactor vessel of the last reduction unit enters the melter gasifier at an oxygen-enriched site, preferably via a burner.

According to a preferred embodiment, the two conveying ducts leading out of the first reduction unit enter the further reduction unit together.

Suitably, the conveying duct leading out of the further reactor vessel of a reduction unit runs into the further reactor vessel of the subsequently arranged reduction unit directly.

Another preferred embodiment is characterized in that the first reduction unit is preceded by a pre-heating vessel for the iron ore into which there enters a gas duct conducting a top gas from the first reduction unit.

DESCRIPTION OF EXEMPLARY EMBODIMENTS

Figure 1:
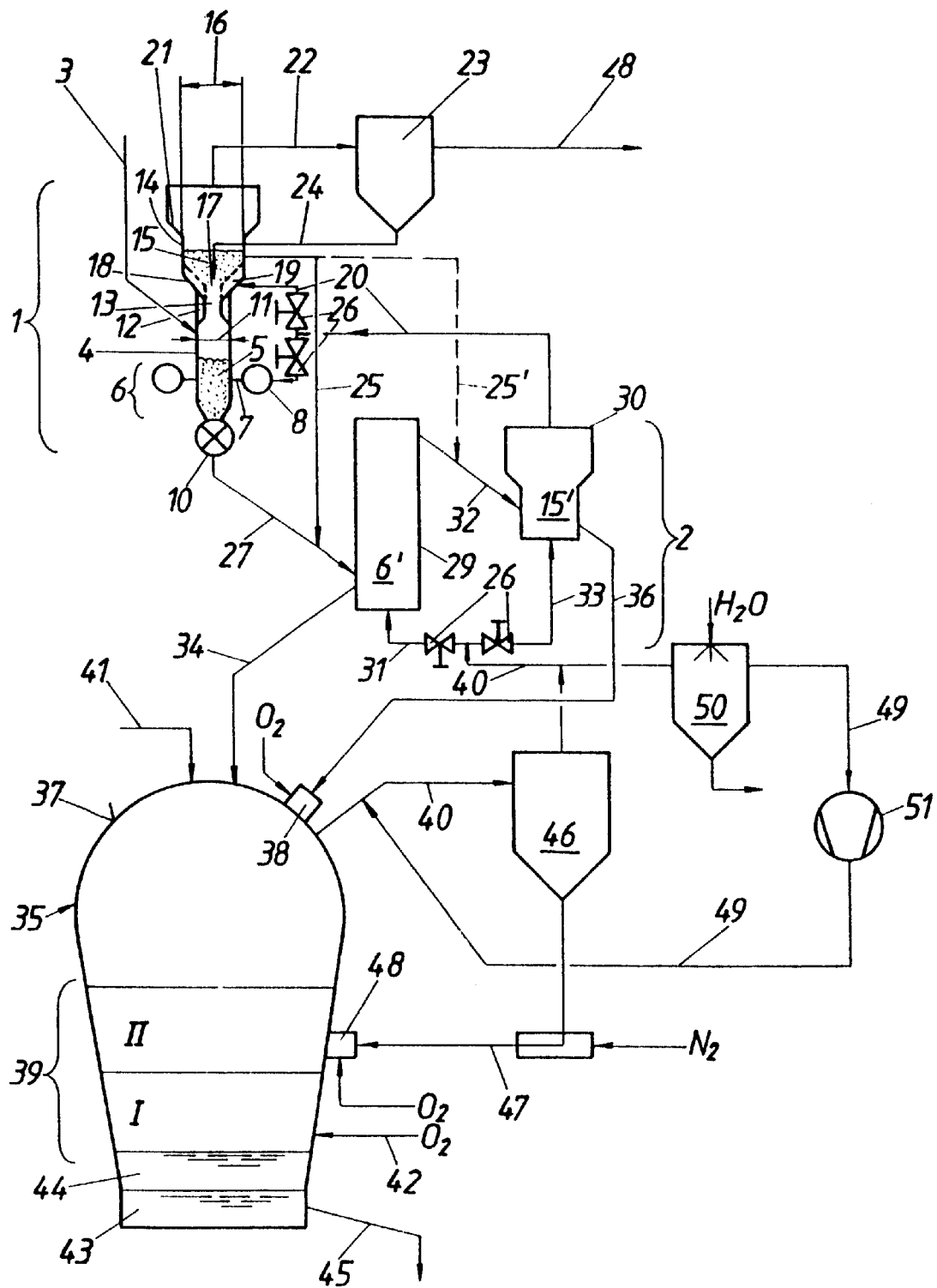
FIGS. 1 to 3 each illustrate an advantageous embodiment of a plant according to the invention in schematic representation.

The plant according to the invention according to FIG. 1 is provided with two reduction stages or reduction units 1 and 2 subsequently connected in series, wherein iron ore—optionally mixed with fluxes—having at least a fine portion (hereinafter called fine-grain fraction) and a coarse portion (hereinafter called coarse-grain fraction) and optionally being already preheated, via an ore feed duct 3 is supplied to the first reduction unit 1. There, prereduction and—in case the iron ore has not been preheated as yet—also preheating take place. This first reduction unit 1 is constructed as follows:

The reduction unit 1 is provided with a first reactor vessel 4 for receiving a first fluidized bed 6 formed of iron ore 5. The fluidized bed 6 is maintained by a reducing gas which is radially symmetrically supplied via a gas feed duct 7 departing from a circular duct 8 surrounding the reactor vessel 4. The ore feed duct 3 enters the reactor vessel 4 laterally.

At the lower end of the frustoconically narrowing reactor vessel 4 a discharging means 10 for pre-reduced iron ore is provided. At the upper end of the first reactor vessel 4 suitably exhibiting a circular cross section 11, at a distance above the fluidized bed 6 a roughly vertically oriented reducing-gas discharging means 12 is provided having a cross section 13, preferably also circular cross section 13, that is contracted as compared to the reactor cross section 11. The discharging means 12 thus forms a nozzle-like contraction. The vertical disposition of the discharging means 12 enables recycling of bigger ore particles accidentally entrained by the upward-flowing reducing gas or of agglomerates forming during reduction into the fluidized bed 6.

Directly above the first reactor vessel 4 a further reactor vessel 14 is provided for accommodating a further fluidized bed 15. Into this further reactor vessel 14, which has a circular cross section 16 that is larger than the cross section 11 of the first reactor vessel 4, the discharging means 12 of the first reactor vessel 4 enters via a radially symmetrically arranged, i.e. here centrally disposed, gas supply opening 17, through which the reducing gas exiting the first reactor vessel 4, which entrains part of the iron ore 5, namely the part having a grain size lying in the lower range of the grain size distribution (fine-grain fraction), enters the fluidized bed 15 and maintains the same. The lower end of the second reactor vessel 14 is likewise constructed to be frustoconical in shape, with the further reactor vessel 14 cantilevering radially outward relative to the first reactor vessel 4, in the shape of a circular ring, i.e. being provided with an outwardly extending circularly ring-shaped enlargement 18.

At this enlargement 18, the further reactor vessel 14 is provided with a radially symmetrically arranged gas distributing bottom 19 for directly feeding a secondary reducing gas streaming in via a gas feed duct 20, which then additionally, along with the reducing gas streaming over into the reactor vessel 14 from the first reactor vessel 4 not only serves for maintaining the fluidized bed 15 in the further reactor vessel 14 but also for sufficiently reducing the fine ore 5 present in this fluidized bed 15. On this occasion, the reduction potential of the reducing gas streaming out of the first reactor vessel 4 is also utilized. The gas distributing bottom 19, which may be constructed as a perforated bottom, a sieve bottom, a valve tray or a bubble plate or the like, is designed to taper off (roughly frustoconically) toward the centrally disposed gas supply opening 17, such that bigger ore particles or agglomerates formed by them fall back into the fluidized bed 6 in the first reactor vessel 4 and are further reduced there. The gas feed ducts 7 and 20 are provided for gas flow in parallel arrangement.

The further reactor vessel 14 is at its upper end provided with an expansion 21 that is also directed radially outward, i.e. that is outwardly cantilevering, as a result of which the gas velocity drops markedly at a distance above the fluidized bed 15, f.i. to approximately half the velocity within the fluidized bed 15, causing a drastic reduction in the amount of dust discharged along with the spent reducing gas that is carried off at the top via the discharge duct 22. The spent reducing gas is purified in a cyclone 23, from which the fine particles thus separated are optionally passed back into the fluidized bed 15 of the further reactor vessel 14 via a recirculating duct 24. The further reactor vessel 14 is provided with a separate discharging means 25, constructed as a conveying duct, for the fine ore 5 reduced in it.

Inside the reduction unit 1, separation of the charged iron ore 5, which has a wide grain size range (dimensions ranging for example from 0.01 to 8 mm), is effected by windsifting by means of the reducing gas into a coarse-grain fraction and into a fine-grain fraction, i.e. into fractions having different grain size distributions. Hereby it is feasible to optimally adjust the flow conditions for fluidization and the retention time of the iron ore to the baking of the grains.

Fine particles carried out of the first lower reactor vessel 4, on account of the nozzle-like contraction 12 are prevented from streaming back into said reactor vessel 4, since they are entrained upwards again by the reducing gas streaming upward through the contraction 12 at an elevated velocity. Volume controlling devices 26 provided in the reducing-gas feed ducts 8 and 20 render it feasible to ensure an optimum gas flow and hence an optimum retention time of the ore particles in the reducing gas for each of the fractions, i.e. for each of the fluidized beds 6 and 15. It is thus feasible to precisely adjust a predetermined degree of metallization of the fine ore, both of the fine-grain and of the coarse-grain fraction, at the lowest possible. consumption of reducing gas, and within a predetermined period of time.

The reduced coarse-grain fraction of the iron ore 5, which is carried out of the first reactor vessel 4 by the discharging means 10, is then conveyed onwards via a solids discharging means 27 constructed as a conveying duct. Via the duct 28, which is connected to the cyclone 23, the purified gas is drawn off along with the residual dust contained in said drawn-off gas.

The second reduction unit 2, in which a largely complete reduction of the prereduced iron ore to sponge iron is effected, is provided with two reactor vessels 29, 30, which, however, are arranged separately, i.e. separately from one another. Together, the conveying duct 27 for the coarse-grain fraction and the conveying duct 25 for the fine-grain fraction enter the first of the two reactor vessels 29 containing a fluidized bed 6' that are arranged in series and are destined to receive the material to be reduced, wherein a reducing gas is fed in through the bottom of said first vessel via a gas feed duct 31. Here, too, windsifting is effected, and the prereduced fine ore separated herein, that is, the fine-grain fraction, via a gas discharging means 32 arranged at the upper end of the first reactor vessel 29 of the second reduction unit 2 is supplied to a fluidized bed 5' in the second reactor vessel 30 of this reduction unit 2 along with the reducing gas.

According to a variant, it is also possible to feed the fine-grain fraction discharged via the discharging means 25 to the second reactor vessel 30 of the second reduction unit 2 directly, via the conveying duct 25', as illustrated by the broken lines in FIG. 1.

To this second reactor vessel 30, again via the bottom thereof, reducing gas is fed via a feed duct 33, which in the upwardly widening dome of this reactor vessel 30 is fed to the first reduction unit 1 together with the reducing gas passed over from the first reactor vessel 29 of this second reduction unit 2 via the gas discharging means 32. Of the gas feed ducts 31 and 33 for the reducing gas, which are arranged for gas flow in parallel arrangement, each is provided with volume controlling devices 26.

The coarse-grain fraction exiting the first reactor vessel 29 of the second reduction unit 2 via a conveying duct 34 is conducted to a melter gasifier 35 by means of the influence of gravity. The fine-grain fraction carried off from the second reactor vessel 30 of the second reduction unit 2 via a discharge duct 36 is conducted to the melter gasifier 35 via a burner 38 arranged at the dome 37 of the melter gasifier 35. The burner 38 causes the particles of the fine-grain fraction to agglomerate, so that they pass into the melt-down gasifying zone 39 gravimetrically.

Inside the melter gasifier 35, in a melt-down gasifying zone 39, a CO- and $H_2$-containing reducing gas is produced from coal and oxygen-containing gas and via the reducing-gas feed duct 40 is conducted to the two reactor vessels 29, 30 of the second reduction unit 2.

The melter gasifier 35 is provided with a feed duct 41 for solid carbon carriers, a feed duct 42 for oxygen-containing gases as well as optionally feed ducts for carbon carriers, such as hydrocarbons, that are liquid or gaseous at room temperature and for calcined fluxes. Inside the melter gasifier 35, below the melt-down gasifying zone 39, molten pig iron 43 or molten steel pre-material respectively and molten slag 44 collect, which are tapped off through a tap 45.

Above the slag 44, a fixed bed I formed of carbon carriers (coke) will form and, thereabove, a fluidized bed II of coarse and, thereabove, of fine particles of carbon carriers (coke particles).

In the reducing-gas feed duct 40 departing from the melter gasifier 35 and running into the two reactor vessels 29, 30, a dedustifying means 46, such as a hot gas cyclone, is provided, the dust particles separated in said hot gas cyclone 46 being fed to the melter gasifier 35 via a return duct 47, with nitrogen as the conveying means and passing via a burner 48 under the blowing of oxygen. The burner 48 can be arranged on the height level of the fluidized bed II or above the fluidized bed II.

For adjusting the temperature of the reducing gas, there is preferably provided a gas recirculating duct 49, which branches off from the reducing-gas feed duct 40 and via a scrubber 50 and a compressor 51 feeds back a portion of the reducing gas into the reducing-gas feed duct 40, namely at a position preceding the hot gas cyclone 46.

Figure 2:
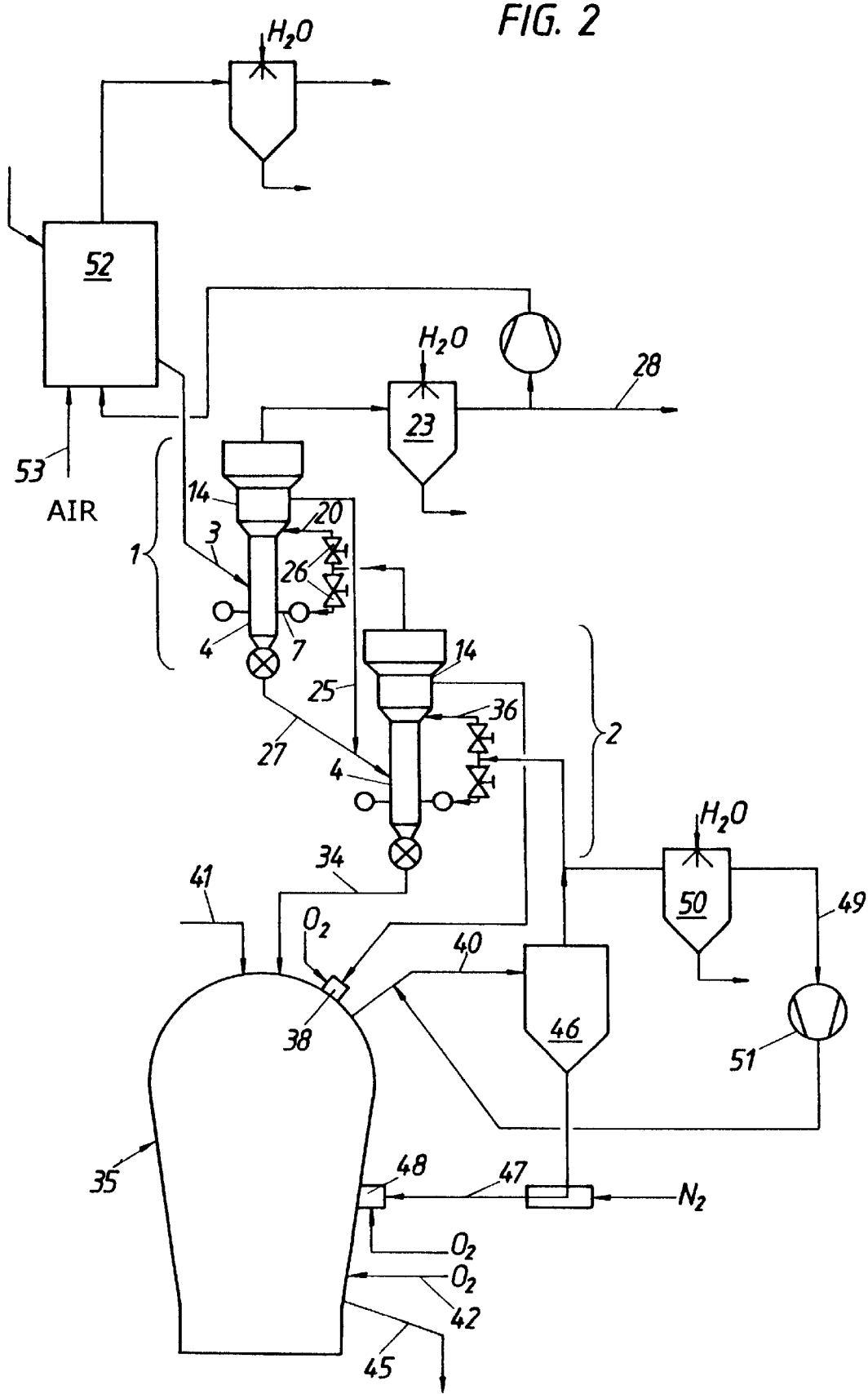

In accordance with the embodiment illustrated in FIG. 2, in which the first reduction unit 1 is connected to be preceded by a preheating stage 52 into which there are supplied a portion of the top gas exiting the first reduction unit 1 as a preheating gas and air via an air feed duct 53, the two reduction units 1, 2 share the same design with each other, namely are constructed in the same manner as the first reduction unit 1 of the embodiment illustrated in FIG. 1.

Figure 3:
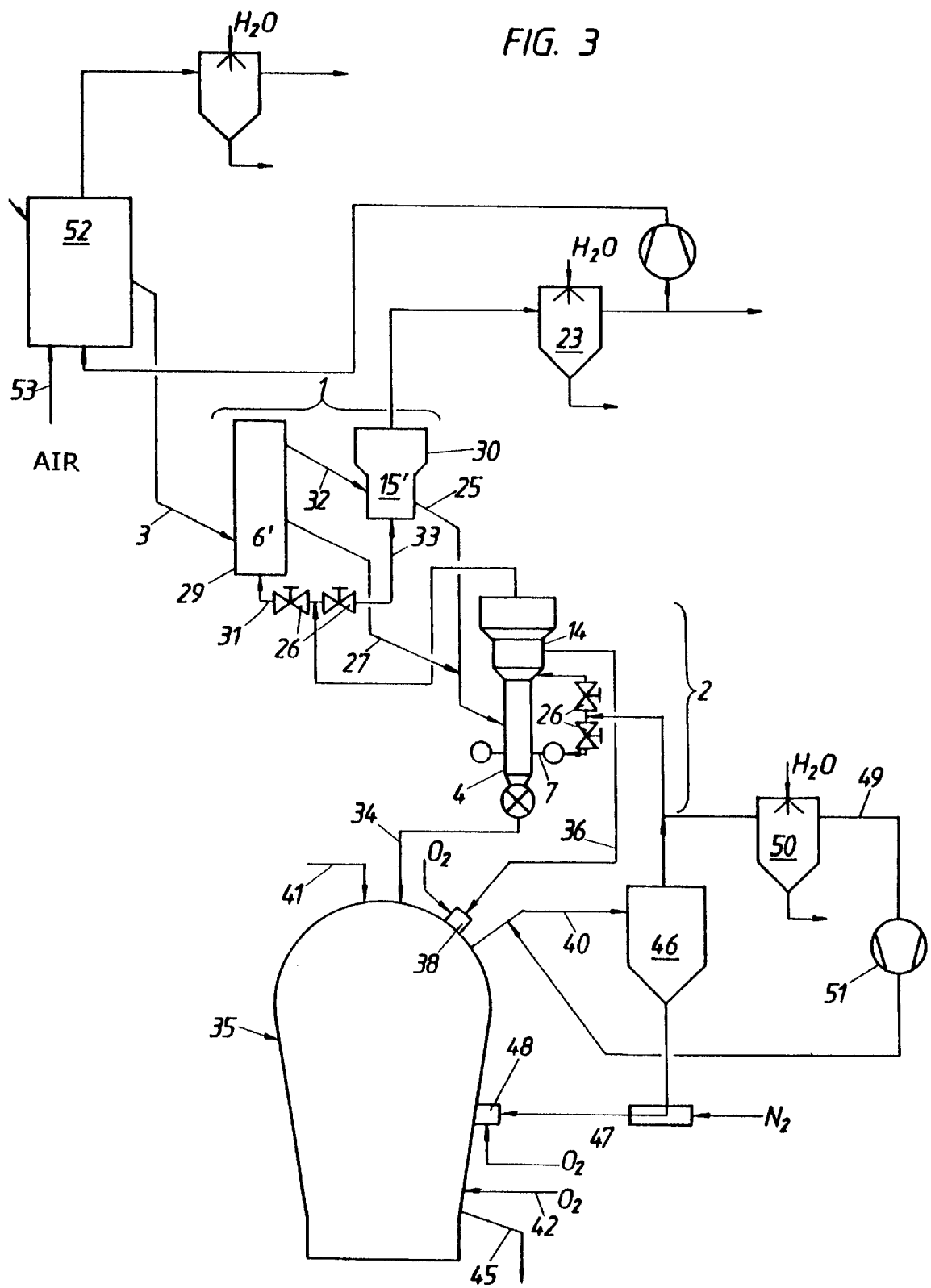

In accordance with FIG. 3, the first reduction unit 1 corresponds to the second reduction unit 2 of the embodiment according to FIG. 1, and the second reduction unit 2 to the first reduction unit 1 of the embodiment according to FIG. 1.

Figure 4:
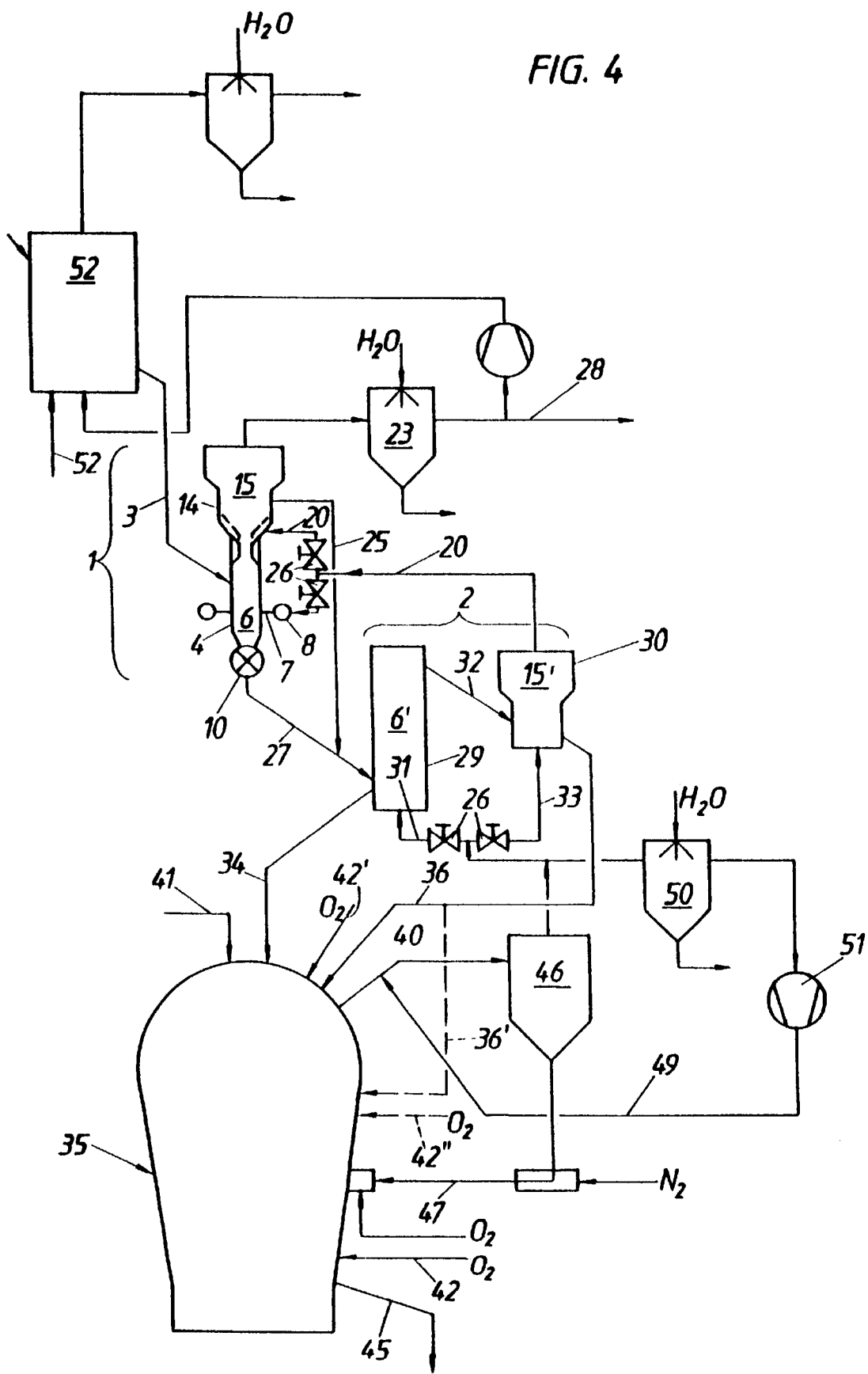
FIG. 4 illustrates an exemplary embodiment comprising a melter gasifier according to a modified embodiment.

FIG. 4 shows a detail of the plant in accordance with a variant according to which the completely reduced fine-grain fraction is introduced into the melter gasifier 35 not via a burner 38, but directly. In the vicinity of the entry site of the discharge duct 36 into the interior of the melter gasifier 35 there enters an oxygen supply duct 42', so that even according to this variant immediate agglomeration of the particles of the fine-grain fraction can take place and discharging of the same by means of the reducing gas conducted out of the melter gasifier 35 is prevented. An entry site of the discharge duct 36 can also be provided in a lower-lying portion of the melter gasifier 35, as is illustrated in FIG. 4 by the duct 36' drawn in a broken line and by the oxygen supply duct 42" sketched in a broken line.

In accordance with the invention, advantages in terms of process technology ensue; among these, an important example is above all the relatively acutely and precisely adjustable separation into a coarse- and a fine-grain fraction, whereby it is feasible to directly charge as high a portion as possible gravimetrically, and only the strictly necessary portion has to be charged into the melter gasifier 35 via the burner 38 or an oxygen-enriched site. As a result, a low performance of the burner will suffice, which in turn leads to a low temperature load in the dome 37 of the melter gasifier 35, so that total energy consumption is low and only relatively little cooling of the reducing gas is necessary. This also reduces the danger of sticking. The fine-grain fraction is melted down during charging, so that dust enrichment in the melter gasifier is avoided. The energy for melting the fine-grain fraction is released via the following chemical reaction, so that the burner can be operated without additional demands of carbon: $2Fe+O_2=2FeO$ The invention is not limited to the exemplary embodiments represented in the drawing but can be modified in various respects. As for the number of the reduction stages or reduction units, this may be chosen freely by those skilled in the art. They may be chosen according to the desired process flow and as a function of the charging materials.

What is claimed is:

1. A process for the production of liquid pig iron or liquid steel pre-products from charging substances comprising iron ore and fluxes and at least partially containing a portion of fines, wherein the iron ore is directly reduced to sponge iron in at least two reduction stages by the fluidized bed method, the sponge iron is melted in a melt-down gasifying zone under the supply the carbon carriers and an oxygen-containing gas, and a CO—$H_2$-containing reducing gas is produced which is injected into the reduction zones of the reduction stages, is reacted there, is withdrawn as a top gas and optionally is supplied to a consumer, wherein:

in the first reduction stage the iron ore by aid of the reducing gas is fractionated into at least one coarse-grain fraction and at least one fine-grain fraction, the fine- and the coarse-grain fractions reduced in the first reduction stage are further reduced in at least one further reduction stage and from the last reduction stage the fine-grain fraction is introduced into the melt-down gasifying zone while being agglomerated by treatment with oxygen, and the coarse-grain fraction is fed directly into the melt-down gasifying zone gravitationally, and wherein in each reduction stage:

each fraction is reduced by the reducing gas in a separate fluidized bed, wherein the reducing gas maintains a first fluidized bed containing the coarse-grain fraction and separates the fine-grain fraction from the coarse-grain fraction, said fine-grain fraction and additional reducing gas are introduced into a second fluidized bed in an amount and/or chemical composition such that reduction of the fine-grain fraction in this fluidized bed to further metallization takes place, and a reduced iron ore is discharged both from first said first fluidized bed and from said second fluidized bed.

2. A process according to claim 1, characterized in that in both reduction stages the grain size distribution of the separated fine-grain fraction is adjusted by adjusting the amount of reducing gas supplied to the first fluidized bed per time unit and, at the same time, the degree of reduction of the fine-grain fraction is adjusted by adjusting the amount of secondary reducing gas which is directly supplied to this fraction.

3. A process according to claim 1, wherein the fine- and the coarse-grain fractions reduced in the first reduction stage are further reduced in a first fluidized bed of the second reduction stage together and the fine-grain fraction is once again separated and supplied to a second fluidized bed of the second reduction stage and there is further reduced.

4. A process according to claim 1, wherein the fine-grain fraction is introduced into the melt-down gasifying zone in close proximity to an oxygen feeding means opening into the melt-down gasifying zone.

5. A process according to claim 1, wherein the fine-grain fraction is introduced into the melt-down gasifying zone by means of a burner.

6. A process according to claim 1, characterized in that the fine grain fraction reduced in the first reduction stage is supplied directly to the second fluidized bed of the further reduction stage and is further reduced therein.

* * * * *